United States Patent Office 3,473,881
Patented Oct. 21, 1969

3,473,881
PROCESS FOR THE DYEING OF ANIONIC POLYMERIC SYNTHETIC TEXTILES AND BLENDS WITH CELLULOSE WITH BASIC DYE BASES
Donald Paul Hallada, Hockessin, Del., assignor to E. I. du Pont de Nemours and Company, Wilmington, Del., a corporation of Delaware
No Drawing. Filed Jan. 14, 1965, Ser. No. 425,623
Int. Cl. D06p 3/82
U.S. Cl. 8—21                                       6 Claims

ABSTRACT OF THE DISCLOSURE

Process for dyeing modified anionic polymers with basic dye bases at 100–230° C. and a pH sufficient to render and/or maintain said dye in a water-insoluble form.

SUMMARY OF THE INVENTION

This invention is directed to the coloration of anionic polymeric substrates at elevated temperatures with water insoluble dyes, which dyes are known as basic dye bases. Said anionic polymeric substrates include shaped articles such as acid-modified acrylic fiber having acid sites, for instance the sulfonate modified acrylic fibers described in U.S. Patents 2,837,500 and 2,837,501, also acid-modified polyester fiber such as polyethylene terephthalate fiber containing metal-sulfonate groups as described more fully in U.S. Patent 3,018,272.

In addition to the polyacrylic fiber noted above and known in the trade as "Orlon" polyacrylic fiber other types are advantageously colored by the process of the present invention. These include the trade-name fibers listed in the following table by manufacturer and country as described in the reference: J.S.D.C. 77, No. 12, page 618 (December 1961).

| Fiber | Manufacturer | Country |
| --- | --- | --- |
| "Ar ilan" 16 | Chemstrand | U.S.A. |
| "Acrybel" | Fabelta | Belgium. |
| "Courtelle" | Courtaulds | U.K. |
| "Crylor" | Soc. Crylor | France. |
| Cyanamid Acrylic Fiber | American Cyanamid | U.S.A. |
| "Dolan" | Suddeutsche Zellwolle | Germany. |
| "Dralon" | Bayer | Do. |
| "Dralon" (New) | do | Do. |
| "Exlan" L | Exlan Ind. | Japan. |
| "Leacryl" 16 | Acsa | Italy. |
| "Orlon" 42 | Du Pont | U.S.A. |
| "Redon" F | Phrix-Werke | Germany. |
| "Tacryl" | Superfosfat | Sweden. |
| "Vonnel" | Shinko | Japan. |

BACKGROUND OF THE INVENTION

The dyeing of anionic polymeric fibers, $F\text{—}SO_3^-M^+$, with basic or cationic dyes $D^+X^-$, is illustrated by the general reaction:

$$F\text{—}SO_3^-M^+ + D^+X^- \rightleftharpoons F\text{—}SO_3^-D^+ + M^+X^-$$

wherein F represents the fiber polymer, M is the acid-modified fiber cation (usually sodium), D is the basic dye chromophore, and X is an anion such as chlorine, methosulfate and the like.

Although the relatively slow exhaust dyeing of anionic polymeric fibers with basic or cationic dyes is commonly used in the trade, this dyeing reaction is associated with several practical problems when attempts are made to achieve: (1) rapid buildup of dye on fibers to give strong dyeings, as in high temperature continuous operations including Thermosol dyeing and printing, and (2) freedom from adverse reactions resulting from dyebath additives such as dispersants and retarders. Different basic dyes respond differently to such additives. This difficulty of control is increased when different dye types, such as acid, direct or disperse dyes are present in the same dye formation with the basic dyes. Acid-base precipitations between the additives and different dye types frequently occur in complex dyeing systems, particularly at lower temperatures, causing uneven and specky colorations.

In the pad dyeing and printing of anionic polymeric fibers, basic dyes are conventionally dissolved in water and then a thickener is incorporated to form the pad liquor or printing paste. However, the padding and printing of basic dyes has been troublesome because of the formation of specks in the dye preparations and in the final colorations. Although these specks appear in varying degrees with different basic dyes and in different coloring systems, the specks are readily observed in light shades, and usually are attributed to either one or both of the following: (1) the tendency of the water-soluble basic dye to crystallize from its concentrated solution used in the coloring preparation, or (2) the precipitation of basic dye by other ingredients that may be present and necessary in formulations, such as anionic dyes, anionic dispersants, anionic carriers such as orthophenylphenol or anionic thickeners such as "Keltex" (sodium alginate) (Kelco Co., Clark, N.J.). Heretofore it has been necessary to limit the thickeners for basic or cationic dyes to nonionic types. Generally, the anionic thickeners are more economical and are used widely in the trade. However, the means for adapting basic dyes so they can be applied with strongly anionic thickeners has remained an unsolved problem. For instance, it has been exremely difficult to color anionic fibers, or mixed goods containing these fibers, commercially with cationic and anionically dispersed disperse dyes without having problems of mottling and specking.

Of particular concern is the efficient and rapid coloration of anionic polymeric fibers that are blended with other fibers such as cellulosics. It is difficult to color the anionic fiber efficiently in such blends because of the generally poor transfer of cationic dyes from a fiber such as cotton to a fiber such as an acid-modified polyacrylic fiber.

DETAILED DESCRIPTION OF THE INVENTION

It is, therefore, an object of the present invention to significantly overcome the above stated troublesome features of applying basic dyes by using said dyes in their base or nonionic, water-insoluble form and by using modified anionic polymeric fibers, thereby effecting unexpected advantages over prior practices, particularly to: (1) effect rapid and full buildup of the basic dye bases in high temperature continuous operations including printing and Thermosol dyeing, (2) increase the compatibility of basic dyes with disperse dye systems found in the trade, with anionic dyes and anionic dispersants, (3) provide basic dye bases in a form which is easily handled in the novel coloring operations, namely in the form of finely divided, water-insoluble, dispersed pastes, (4) assure freedom from specks, which contain basic dye, and appear in the coloring formulation and in the colored fabric, and (5) increase the ease with which basic dyes are incorporated into dyebaths and into printing pastes.

These and other objects of the invention will become apparent from the following description and claims.

More specifically, the present invention is directed to a process for the coloration of anionic polymeric substrates at elevated temperatures, the improvement therein being one which comprises coloring said substrate having a cation selected from the group consisting of H and $NHR_1R_2R_3$ where $R_1$, $R_2$ and $R_3$ separately represent H or $C_{1-3}$ alkyl, with nonionic thermally-stable basic dye bases at a temperature of about 100° to 230° C. and at a pH sufficiently basic to maintain the dye in essentially water insoluble form. Preferred embodiments include the heretofore described process wherein (a) dry heat is utilized at about 182° to 230° C. for about 2 seconds to 5 minutes; (b) steam is utilized at about 100° to 126° C. for about 5 to 60 minutes; (c) the substrate is essentially polyacrylonitrile containing ammonium sulfonate groups; and (d) the substrate is a blend of polyacrylic fibers containing ammonium sulfonate groups and of cotton fibers.

The novel process of this invention may be applied to said blends wherein cotton is replaced by rayon. This process may be conducted as a pad dyeing operation or as a printing operation in the presence of a printing thickener. Where blends are colored, said invention process may be conducted so that the cellulosic fiber is colored in the same operation by a standard vat or fiber-reactive dyeing process.

By thermally-stable dyes it is intended to refer to dyes which retain their normal tinctorial value at temperatures as high as those used in the Thermosol process, about 180°-230° C. and over a period of time required to fix the dye, say from a few seconds to about 2 minutes.

Although the exact mechanism of the reaction involved in the present invention between basic dye base and substrate is not fully understood, it is believed that the dye sites must be in the free sulfonic acid form sometime during the coloring operation. Thus, when the ammonium sulfonate form of polyacrylic fiber is employed, for instance, it is presumed that $NH_3$ splits off the dye site at the high temperatures affording a more dye-receptive site. Simultaneously the basic dye base builds up to strong and fast shades on the acidic fiber. This result is not the case when basic dye bases are applied to the sodium sulfonate form of polyacrylic fiber, otherwise following the process of the present invention. In the latter instance much weaker colorations are obtained which show more tendency to sublime. It is proposed that the difficulty here is due to the inability of the sodium ion to be transported in the dry state, together with inability to protonate the basic dye base within the fiber. It becomes apparent, therefore, that the significant advantages of the present invention are particularly pronounced when blends of acrylic and cotton fibers are colored. In this instance, the basic dye base is largely absorbed by the cotton during the padding or printing step. During fixation of dye at higher temperatures dye transfer takes place so that the cotton remains undyed with the basic dye base.

The unique advantages of the present invention process can be demonstrated by either padding or printing followed by fixation either by steam or dry heat.

It is important in the practice of the present invention that the pH is sufficiently high, usually close to 7 or higher, so that the basic dye base is maintained in essentially water insoluble form. In this form the dye transfers readily at high temperatures from cotton to acid-modified polyacrylic or polyester fibers when such fiber blends are used in the process. The cationic or acid salt form of the basic dyes have poor transfer properties in such coloration processes.

Another important consideration in the present invention is the form in which the acid group of the acid-modified fiber is employed. Ordinarily, acid-modified polyacrylic fiber, for example, is used in the trade as the sodium sulfonate derivative of the polymer. Quite surprisingly, this form of the fiber gives considerably weaker dyeings when employed as a control in the process of the present invention. It is unexpected that the shift of the fiber cation from sodium to hydrogen, ammonium or alkylammonium affords dyeings on such fibers which exhibit outstanding buildup to strong shades. Furthermore, it is unexpected that both the heavy shades and efficient transfer are achieved on blends of cotton and the above described selected acid-modified fibers when the conditions of pH and basic dye base are followed according to the present invention.

The isolated dye base is preferably milled in the presence of a dispersant to provide a dispersed paste which is readily incorporated into padding and printing formulations.

The preferred dispersants for the basic dye bases are those of the anionic type such as the alkali metal or ammonium salts of the lignin sulfonic acids and the alkali metal, alkaline earth metal or ammonium salts of the condensation product of formaldehyde and 1- or 2-naphthalenesulfonic acid.

The conditions under which the cationic dye bases are fixed on the preferred fiber modification can be varied widely. These dye bases can be fixed at low temperatures (100° C. steam for 20 minutes) as illustrated in Example 9(c), conditions common to the printing trade. Conversely fixation can also be achieved in satisfactory fashion by dry heat at higher temperatures such as about 182° to 230° C. which temperature range is suitable for a high speed Thermosol dyeing process. These high temperatures may be attained by heated air, by contact with hot metal surfaces such as internally heated rolls, by infrared radiation, and by passage through molten metal.

The basic dye bases employed in the present invention are selected from many dye classes such as the representative triarylmethane, xanthene, methine, thiazole, azine, oxazine, azo, anthraquinone, nitro and quinophthalone dye types.

The dye base forms may be prepared by direct synthesis, e.g. the condensation of 1-amino-2,4-dibromoanthraquinone with N,N-dimethyl-1,3-propanediamine or by treatment of the acid salt of such a dye base with alkali. The basic form of triarylmethane dyes, e.g. Victoria Green carbinol, is prepared by well known methods. Essentially water insoluble basic dye bases of the azo class are illustrated by primary, secondary and tertiary amino derivatives of azo dyes disclosed in U.S. Patent 2,972,508. Still other types of basic dye bases are illustrated below.

It is to be understood that more than one basic dye base may be employed in a given dyeing operation according to the present invention. Likewise, different types of dye such as basic dye bases and conventional disperse, direct, vat or fiber reactive dyes may be applied to the modified anionic fiber/cotton blends in the same dyeing operation, as illustrated in the examples. Olso, anionic polymeric fibers alone may be colored by mixed dye types, such as a mixture of basic dye bases and disperse dyes.

Numerous basic dye bases suitable for use in the present invention are further illustrated by the following descriptions in which dye structures,

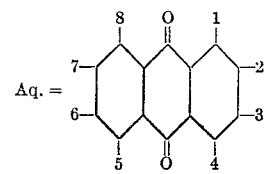

(1) The free dye base of Example 5 of U.S. Patent 2,183,652 except that the 20 parts of monoethanolamine are replaced by 29 parts of the "unsymmetrical diethyl ethylene diamine" disclosed on page 2, column 1, line 2 of the patent.

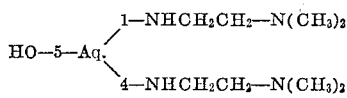

(2) The free dye base of Example 9 of U.S. Patent 2,611,772 (prepared in the absence of air).

(3) The free dye base of Example 9 of U.S. Patent 2,611,772 (prepared in the presence of air).

$$HO-5\diagdown_{Aq.}\diagup 1-NH-(CH_2)_3-N(CH_3)_2$$
$$HO-8\diagup \diagdown 4-NH(CH_2)_3-N(CH_3)_2$$

(4) The free dye base of Example 1 of U.S. Patent 2,701,802

$$H_2N-1\diagdown_{Aq.}\diagup 2-\overset{O}{\underset{\|}{C}}\diagdown N-CH_2CH_2NH_2$$
$$H_2N-4\diagup \diagdown 3-\underset{\|}{\overset{O}{C}}\diagup$$

(5) The free dye base of Example 8 of U.S. Patent 2,701,802

$$H_2N-1\diagdown_{Aq.}\diagup 2-\overset{O}{\underset{\|}{C}}\diagdown N-CH_2CH_2CH_2-N\diagup\overset{H}{\diagdown CH_2CH_2OH}$$
$$H_2N-4\diagup \diagdown 3-\underset{\|}{\overset{O}{C}}\diagup$$

(6) The free dye base of Example 9 of U.S. Patent 2,701,802

$$H_2N-1\diagdown_{Aq.}\diagup 2-\overset{O}{\underset{\|}{C}}\diagdown N-CH_2CH_2CH_2-N\diagup\overset{CH_3}{\diagdown CH_3}$$
$$H_2N-4\diagup \diagdown 3-\underset{\|}{\overset{O}{C}}\diagup$$

(7) The free dye base of Example 1 of U.S. Patent 2,716,655

$$\overset{1-NH_2}{Br-2-Aq.\diagdown_{4-NH-CH_2CH_2CH_2-N}\diagup\overset{CH_3}{\diagdown CH_3}}$$

(8) The free dye base of Example 3 of U.S. Patent 2,716,655

$$\overset{1-NH_2}{Br-2-Aq.\diagdown_{4-NH-CH_2CH_2-N}\diagup\overset{C_2H_5}{\diagdown C_2H_5}}$$

(9) The free dye base of Example 5 of U.S. Patent 2,888,467

$$HO-4-Aq.\diagdown\overset{1-NH_2}{2-O-\bigcirc-CH_2-N\diagup\overset{CH_3}{\diagdown CH_3}}$$

(10) The free dye base of the dye of the second paragraph of Example 10 of U.S. Patent 3,036,078.

$$Aq.\diagdown\overset{1-NHCH_3}{4-NH-CH_2CH_2-NH-\overset{O}{\underset{\|}{C}}-CH_2-N\diagup\overset{CH_3}{\diagdown CH_3}}$$

(11) The free dye base of Example 1 of U.S. Patent 3,040,064 prepared from 2-bromoquinizarin and N,N'-dimethylpropylenediamine.

$$HO-1\diagdown_{Aq.-2-N-CH_2CH_2CH_2-N}\diagup\overset{H}{\diagdown CH_3}$$
$$HO-4\diagup\overset{|}{CH_3}$$

(12) The free dye base of Example 1 of British Patent No. 459,594.

$$Aq.-1,4-di-NH-\bigcirc-OCH_2-CH_2-N\diagup\overset{C_2H_5}{\diagdown C_2H_5}$$

(13) The free dye base of Example 8 of British Patent No. 459,594

$$Aq.\diagdown\overset{1-NH_2}{4-NH-CH_2CH_2CH_2-N\diagup\overset{CH_3}{\diagdown CH_3}}$$

(14) The violet dye base under Type 7, page 8 of British Patent No. 459,594

$$Aq.-1,4-di-NH-CH_2-\overset{OH}{\underset{|}{CH}}-CH_2-S-CH_2CH_2-NH_2$$

(15) The free dye base of Example 4 of British Patent No. 807,241

$$Aq.\diagdown\overset{1-NHCH_3}{5-NH-CH_2CH_2CH_2-N\diagup\overset{CH_3}{\diagdown CH_3}}$$

(16) The first dye of Table I on page 589 of the Journal of the American Chemical Society, vol. 76 (1954).

$$Aq.\diagdown\overset{1-CH_3}{4-NH-CH_2CH_2CH_2-N\diagup\overset{C_2H_5}{\diagdown C_2H_5}}$$

(17) The free dye base of Example 1 of British Patent No. 824,530.

$$H_2N-1\diagdown_{Aq.-2-\overset{O}{\underset{\|}{C}}-NH-CH_2CH_2CH_2-N\diagup\overset{CH_3}{\diagdown CH_3}}$$
$$H_2N-4\diagup$$

(18) The free dye base of Example 6 of British Patent No. 824,530.

$$H_2N-1-Aq.-2-\overset{O}{\underset{\|}{C}}-NH-CH_2CH_2CH_2-N\diagup\overset{CH_3}{\diagdown CH_3}$$

(19) The free dye base of Example 1 of British Patent No. 925,111.

$$H_2N-1-Aq.-2-\overset{O}{\underset{\|}{C}}-NH-CH_2CH_2CH_2-N\diagup\overset{H}{\diagdown}\diagup\overset{CH_2-CH_2}{\diagdown CH}\diagdown\overset{CH_2}{CH_2-CH_2}$$

(20) The free base of Example 2 of British Patent No. 925,111.

$$H_2N-1\diagdown_{Aq.-2-\overset{O}{\underset{\|}{C}}-NH-CH_2CH_2CH_2-N\diagup\overset{H}{\diagdown}\diagup\overset{CH_2-CH_2}{\diagdown CH}\diagdown\overset{CH_2}{CH_2-CH_2}}$$
$$H_2N-4\diagup$$

(21) The free dye base of Example 5 of German Patent No. 1,073,129.

$$H_2N-1-Aq.-2-\overset{O}{\underset{\|}{C}}-O-CH_2CH_2-N\diagup\overset{CH_3}{\diagdown CH_3}$$

(22) The free dye base of Example 10 of German Patent 1,073,129

$$H_2N-1\diagdown_{Aq.-2-\overset{O}{\underset{\|}{C}}-OCH_2CH_2-N\diagup\overset{CH_3}{\diagdown CH_3}}$$
$$HO-4\diagup$$

(23) The free dye base of Example 12 of German Patent No. 1,073,129.

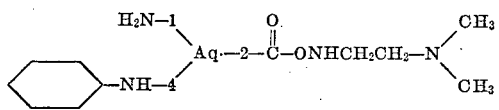

(24) The free dye base of Example 2 of German Patent No. 1,082,916

Aq.—1—NH—CH$_2$CH$_2$—NH$_2$

The following azo dye bases are typical representatives of those which may be utilized in the practice of the present invention.

(1) The free dye base of Example 5 of U.S. Patent 2,022,921.

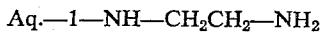

(2) The free dye base of Example 6 of U.S. Patent 2,022,921.

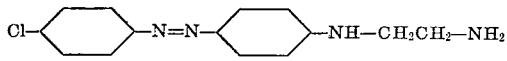

(3) The free dye base of Example 1 of U.S. Patent 2,022,921

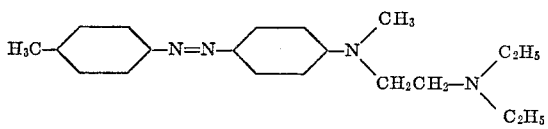

(4) The free dye base of Example 1 of U.S. Patent 2,238,485

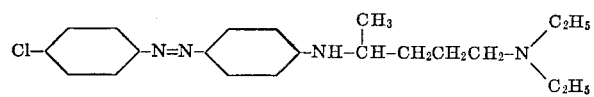

(5) The free dye base of Example 4 of U.S. Patent 2,972,508

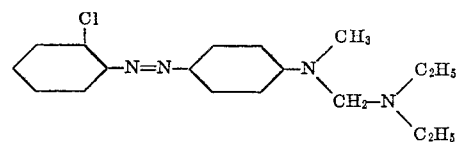

(6) The free dye base of Example 30 of U.S. Patent 2,972,508

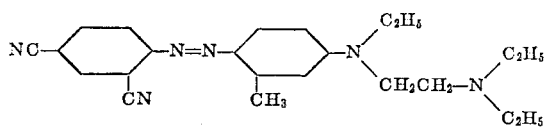

(7) The free dye base of Example 32 of U.S. Patent 2,972,508

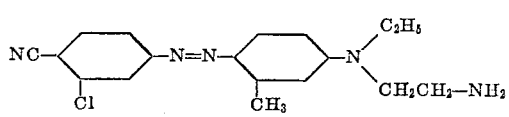

(8) The free dye base on page 8, line 15 under Type 4 of British Patent 459,594

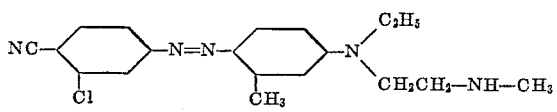

(9) The free dye base on page 8, line 86 under Type 16 of British Patent 459,594

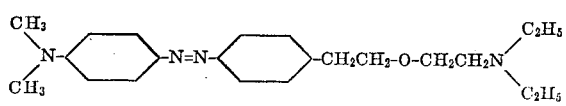

(10) The free base of the dye at page 8, line 39 under Type 5 of British Patent 459,594

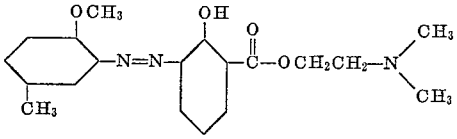

(11) The free dye base of Example 4 of German Patent No. 1,085,276

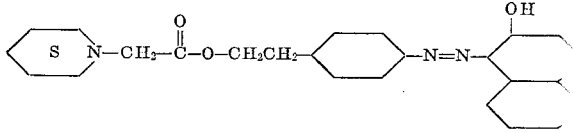

Triarylmethane carbinols useful in the practice of the present invention are illustrated by the following dyes:

(1) The carbinol form of C.I. Basic Green 1, C.I. 42,040.

(2) The carbinol form of C.I. Basic Violet 14, C.I. 42,510.

(3) The carbinol form of C.I. Basic Green 4, C.I. 42,000.

(4) The carbinol form of C.I. Basic Blue 1, C.I. 42,025.

Nitro basic dye bases useful in this invention are illustrated by the dyes:

(1) The free dye bases of Example 1 of U.S. Patent 2,834,794

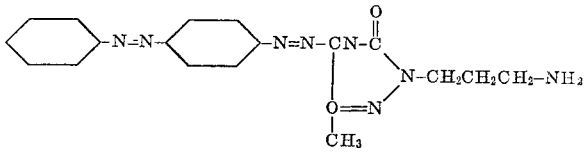

and

(2) The free dye base of Example 1 of U.S. Patent 2,834,793

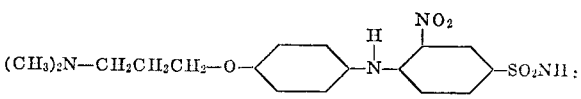

Xanthene dye bases useful in the present invention are illustrated by the dyes:

(1) The free dye base of C.I. Basic Violet 10, C.I. 45,170.

(2) The free dye base of C.I. Basic Red 1, C.I. 5,160.

Methine dye bases useful in this invention are illustrated by the dyes:

(1) The free dye base of Example 5, U.S. Patent 2,155,459, page 2, line 23, the condensation product of 1,3,3-trimethyl-2-methylene-indoline-omega-aldehyde and p-nitroaniline.

(2) Same as (1) above, except the dye base of the dye disclosed on page 2, line 26 of U.S. Patent 2,155,459 in which p-anisidine was used as intermediate.

(3) Same as (1) above, except the dye base of the dye disclosed on page 2, line 27 of U.S. Patent 2,155,459 in which p-toluidine was employed as the intermediate.

The free base forms of these dyes are prepared by treating a solution of the condensation product with sodium hydroxide sufficient to raise pH above 7.

Quinophthalone basic dye bases which may be utilized are illustrated by the dyes:

(1) The free dye base of Example 1 of U.S. Patent 3,023,212

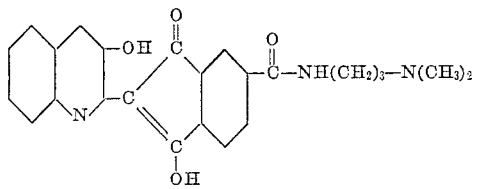

(2) The free dye base of Example 4 of U.S. Patent 3,023,212

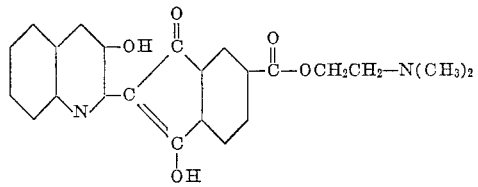

(3) The free dye base of Example 7, U.S. Patent 3,023,212

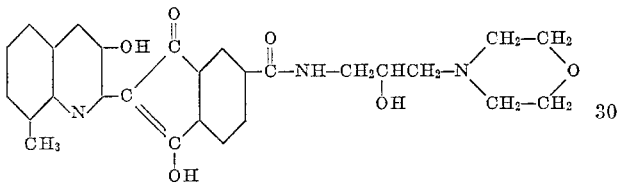

(4) The free dye base of Example 8, U.S. Patent 3,023,212

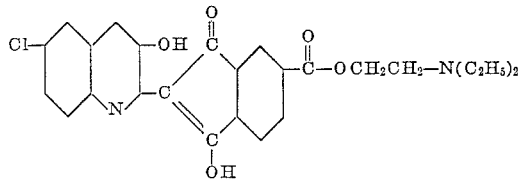

Representative examples further illustrating the invention follow.

EXAMPLE 1

(a) One part of a woven fabric composed of acid-modified ($SO_3Na$ form) polyacrylic staple fiber was treated for 30 minutes at 88° C. in a bath containing 40 parts of water and 0.8 part of ammonium sulfate. The fabric thus obtained in its ammonium sulfonate form was rinsed thoroughly in water and dried.

(b) The dried fabric from part (a) was passed through a padding bath consisting of a dye dispersion prepared by adding sodium hydroxide to a solution containing 8 g./l. of the violet dye 1-(3-dimethylaminopropylamino)-4-hydroxyanthraquinone hydrochloride and 3 g./l. of nonionic dispersant (the condensation product of 20 moles of ethylene oxide with 1 mole of $C_{18}$ alcohol) until the pH was adjusted at 8.5. The wet fabric was squeezed between rolls so as to retain 75% of its dry weight of the padding bath liquor. The fabric was dried and then heat treated in a circulating hot air oven at 210° C. for 90 seconds. The dyed fabric was rinsed in water, scoured to remove unfixed dye, and finally dried. A bright, clear violet dyeing having excellent fastness to light, washing and sublimation was obtained.

Similar results were obtained when the 0.8 part of ammonium sulfate used in this example was replaced by an equivalent amount of ammonium chloride, ammonium phosphate or ammonium acetate.

When part (b) of this example was carried out using ordinary commercial polyacrylic fiber having sodium sulfonate dye sites, only a weak, dull shade having poor light, wash, and sublimation fastness was obtained.

EXAMPLE 2

(a) When the process of Example 1(b) was applied to a fabric composed of staple fiber of acid-modified polyacrylic polymer prepared so that the sulfonate group cations were ammonium ions (parts (b) and (c), below) equally good results were obtained.

(b) Acrylic polymers having only ammonium cations were prepared in a continuous polymerization reaction in the following manner (see U.S. Patent 2,837,501):

A 5-gallon jacketed stirred reactor having an overflow nozzle located at a level corresponding to 30 pounds of water was used. This nozzle was submerged below the surface of a second stirred vessel, permitting the first to operate under a slight nitrogen pressure. The jacket was used to control the reaction at 50° C.±1°.

After filling the reactor with distilled water, the chemical reactants were pumped into the stirred reactor and allowed to overflow continuously. After 3–4 volumes had passed through, the product had essentially reached steady-state and was of uniform composition.

Individual feed streams were fed to the reactor as follows, the water containing sulfuric acid to pH 3.2:

| | Lbs./hr. |
|---|---|
| (1) Water | 7.2 |
| (2) Acrylonitrile/methylacrylate 94/6 wt. percent | 6.0 |
| (3) Ammonium styrenesulfonate 1% in water | 1.8 |
| (4) Ammonium persulfate 1% in water | 1.8 |
| (5) Ammonium bisulfite 2% in water | 13.2 |
| | 30.0 |

These feeds correspond to 20% monomer based on total, 0.3% ammonium persulfate based on monomer, 2.2% ammonium bisulfite based on monomer and a calculated average residence time of one hour. The product was 93.6/6.1/0.3 AN/MA/styrene sulfonic acid in 85% conversion at 1.2–1.4 inherent viscosity in dimethylformamide. The ionic groups were the ammonium sulfate and sulfonate end groups from the initator system and sulfonate comonomer. Assay of the polymer for free sulfonic acids by a titrametric method showed none to be present (the polymerization had been quenched by adjusting the catch basin to pH 7–8 with ammonium hydroxide). Assay for ionic groups showed the expected 58–60 milliequivalent/kilogram.

The procedure is applicable to other amines e.g., triethylamine, tributylamine, dimethylamine, ethylamine, ethanolamine, diethanolamine, triethanolamine, morpholine and piperidine.

Preparation of ammonium styrenesulfonate

A sulfonic acid ion exchange resin in hydrogen ion form was loaded into a glass column. Down through the column was passed a 20% solution of sodium styrenesulfonate at an average contact time of one minute. The effluent was free styrenesulfonic acid containing no sodium ion according to a flame test. (The bed capacity was equivalent to 10% its own weight of dry sodium styrenesulfonate.) The resulting styrene sulfonic acid was neutralized with ammonium hydroxide or the desired amine. Assay for vinyl activity by a standard bromate-bromide method showed one double bond for each sulfonic acid in agreement with theory.

(c) Fibers were dry spun from the polymer made in part (b) of the present example. A solution of 30% solids at 115° C. in dimethylformamide (1.4%) was extruded into a chimney of hot gases (315° C.) to form 140 filaments of 8.4 denier each and wound up at 300 yards per minute. These were drawn 4× in water at 98° C., cut into staple 2 inches long and dried 15 minutes at 130° C. in hot air.

This staple was spun into 14/1 cotton count yarn at 15 turns per inch and the resulting thread woven at 62 x 48 ends per inch.

Dyeing tests with cationic dyes applied from boiling water showed approximately the same rate and depth of dyeing as when the cations were sodium instead of ammonium. Additional dyeing tests as described above showed these fibers to dye much stronger than sodium modifications in Thermosol dyeing.

EXAMPLE 3

When Example 1, parts (a) and (b), was repeated except that an intimate blend of 50% acid-modified ($SO_3Na$ form) polyacrylic fiber and 50% cotton fiber was substituted for the acid-modified polyacrylic fiber, the same excellent dyeing of the acrylic portion of the blend was obtained. The cotton fiber remained undyed.

When the cotton portion of the above blend was replaced by rayon fiber, similar results were obtained.

EXAMPLE 4

A fabric consisting of a 50:50 blend of acid-modified polyacrylic fiber and cotton was dyed with a mixture of 6 g./l. of the blue dye 1-amino-2-bromo-4-(3-dimethylaminopropylamino)anthraquinone, 4.3 g./l. of the vat blue 3,3'-dichloroindanthrone (C.I. 69,825) and 0.5 g./l. of the vat violet dichloroisodibenzanthrone (C.I. 60,010) in the dye pad bath in the form of finely divided dispersed pastes. The procedures of Example 1 (a) and (b) were followed except that after the heat treatment step in part (b) the fabric was padded at 100% pickup with 75 g./l. of sodium hydroxide and 75 g./l. of sodium hydrosulfite, steamed for 30 seconds at 100°–102° C., rinsed with water, and then oxidized for 10 minutes at 43° C., in a bath containing 2.5 g./l. of sodium perborate. The dyed fabric was rinsed, soaped for 1 minute at 93° C. in a bath containing 5 g./l. of oleate soap, rinsed and dried. The fabric was dyed to a clear blue solid union shade having outstanding fastness to light, washing and sublimation.

When the fiber blend used in the present example was replaced by a 50:50 blend of acid-modified polyacrylic and rayon fibers similar results were obtained.

EXAMPLE 5

(a) A mixed polyacrylic and cotton fiber was dyed with a mixture of 6 g./l. of the blue dye 1-amino-2-bromo-4-(3-dimethylaminopropylamino)anthraquinone used in the form of a finely divided dispersed paste, 10.5 g./l. of "Remazol" Brilliant Blue R was used as a finely divided dispersable powder, 1.35 g./l. of "Remazol" Brilliant Violet 5 R used as a finely divided powder, 2 g./l. "Keltex" (sodium alginate; Kelco Co., Clark, N.J.) an anionic thickener, and 4 g./l. of sodium dodecylbenzenesulfonate wetting agent in the dyebath. Note the above "Remazol" dyes are described by J. Pannchartek et al. in Coll. Czech. Chem. Comm. 25, 2783 (1960) and 27, 268 (1962).

The procedures of Example 1(a) and (b) were followed except that after the heat treatment step in part (b) half the fabric was padded at 100% pickup with an aqueous solution of 275 g./l. of sodium chloride and 7.5 g./l. of sodium hydroxide, then steamed for 30 seconds at 100°–102° C. rinsed in water, rinsed in a solution containing 5 g./l. of sodium bicarbonate, rinsed in water, soaped, for 1 minute at 93° C. in a bath containing 5 g./l. of oleate soap, and finally rinsed and dried.

(b) The remaining half of the heat-treated fabric from part (a) of the present example was padded with a solution of sodium chloride and sodium hydroxide as before, then rolled up on a mandrel and held at room temperature for 8 hours. The fabric was then rinsed and soaped as described above.

Both portions of the fabric ((a) and (b)) were dyed to clear blue, solid union shades having outstanding fastness to light washing and sublimation.

(c) Part (a) of this example was repeated except that the color pad liquor also contained 10 g./l. of sodium bicarbonate and 10 g./l. of sodium borate decahydrate. The dried padding was heat treated in a circulating hot air oven at 210° C. for 90 seconds. Both the chemical padding and steam steps were omitted. After rinsing and soaping as before, the fabric was dyed to a clear blue, solid union shade having excellent fastness.

EXAMPLE 6

A mixed polyacrylic and cotton fiber was dyed with a mixture of 4 g./l. of the blue dye 1-amino-2-bromo-4-(3-dimethylaminopropylamino)anthraquinone used in the form of a finely dispersed paste, 4 g./l. of Victoria Green carbinol (C.I. 42,000, carbinol form), 16 g./l. of the direct red dye C.I. 22,310, 0.75 g./l. of "Superclear" Gum (a refined solution of Karaya gums, Jacques Wolf and Company, 60 Park Place, Newark 1, N.J.), and 4 g./l. of sodium dodecylbenzenesulfonate wetting agent in the pad bath.

The procedures of Example 1(a) and (b) were followed except that the heat treatment step in part (b) was carried out at 221° C. After heat treatment the fabric was padded at 100% pickup with an aqueous solution of 100 g./l. of sodium chloride, then steamed for 60 seconds at 100° C., rinsed in cold water and dried. The acrylic portion of the fabric was dyed a blue shade while the cotton was dyed a dark red. The fabric had a clear crossdyed appearance.

When this example was repeated except that the fabric was not pretreated (as in Example 1(a), only the cotton was dyed in full shade.

EXAMPLE 7

When the process of Example 1, parts (a) and (b), was repeated except that a mixture consisting of 12 g./l. of 4 - nitro - 9 - acridanone and 4 g./l. of Victoria Green carbinol (C.I. 42,000, carbinol form) as a finely divided dispersed paste was substituted for the violet dye, 4 g./l. of sodium dodecylbenzenesulfonate were added to the pad bath, and the heat treating temperature was raised to 216° C. A strong clear green shade was obtained having excellent fastness properties.

When the process of this example was repeated substituting an intimate blend of 50% acid-modified ($SO_3Na$ form) polyacrylic fiber and 50% cotton fiber, similar excellent dyeing of the acrylic portion of the blend was obtained. The cotton fiber remained undyed.

When the above processes were repeated, omitting the pretreatment step (part (a) of Example 1), only weak dyeings having poorer fastness were obtained.

EXAMPLE 8

When the process of Example 1, parts (a) and (b), was repeated except that the ammonium sulfate in part 1 (a) was replaced by 10 g./l. of sulfuric acid a substantially stronger and brighter dyeing was obtained than when the process of Example 1 (b) was carried out on untreated control fabric.

EXAMPLE 9

Two-tenths part of the blue dye base bis(4 - amino-m-tolyl) (o - chlorophenyl)methane carbinol was thoroughly mixed with 39.8 parts of water (25° C.) in the presence of an anionic dispersant. The resulting dispersion was stirred into 60 parts of a neutral thickener, prepared by mixing 5 parts of modified locust bean gum thickener ("Polygum" 260, Polymer Industries, Inc., Springdale, Conn.) with 95 parts of water and neutralizing with acetic acid. This paste was printed from an intaglio engraved roller onto fabric of acid-modified polyacrylic fibers and onto similar fabric which had been pretreated with ammonium sulfate as described in Example 1 (a). The prints were dried at 76° C. for 2 minutes in a flue dryer. Each of the dried prints was then divided into 3 parts and treated as follows:

(a) One part of each of the dried prints was heated for 90 seconds at 200° C. in a hot air oven.

(b) One part of each of the dried prints was steamed for 1 hour at 5 p.s.i.g. (109° C.) in a cottage steamer. If desired, steam at 20 p.s.i.g. (126° C.) may be employed for a period of 15 minutes.

(c) One part of each of the dried prints was steamed for 20 minutes at 100°–102° C. in a Rapid Ager. All prints were then rinsed, soaped for 5 minutes at 60° C. in a bath containing 0.07 g./l. of the sodium salt of the sulfate of the condensation product of ethylene oxide and oleyl alcohol, rinsed and dried.

In each case the print on the pretreated fabric was sharper and stronger than the corresponding print on the untreated control fabric. Similar results were obtained when the above blue dye was replaced by other dye bases such as:

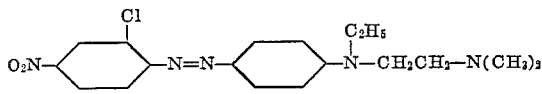

the carbinol form of Rhodamine B (C. I. 45,170B) of the structure

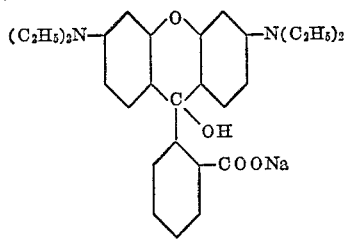

and the quinophthalone basic dye base of the structure

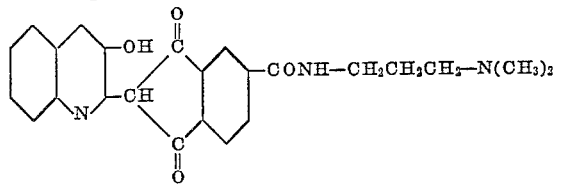

EXAMPLE 10

When Example 1, parts (a) and (b), was repeated substituting the 1,4 - diamino - N - (2-aminoethyl)-2,3-anthraquinone dicarboximide of Example 1 of U.S. Patent 2,701,802 for the violet dye, a fast blue dyeing was obtained on the acrylic fabric.

EXAMPLE 11

When Example 1, parts (a) and (b), was repeated substituting the free dye base of Example 8 of U.S. Patent 2,701,802 for the violet dye a fast blue dyeing was obtained on the acrylic fabric. Said dye of Example 8 of U.S. Patent 2,701,802, containing a pendant secondary amino group, has the structure

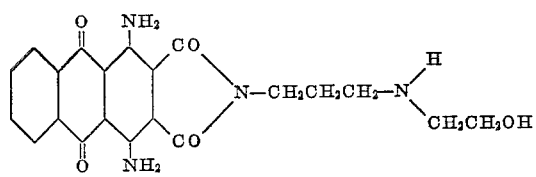

EXAMPLE 12

When Example 1, parts (a) and (b), was repeated substituting the free dye base of Example 9 of U.S. Patent 2,701,803 for the violet dye a fast blue dyeing was obtained on the acrylic fiber. The dye of said Example 9 contains a pendant tertiary amino group and has the structure:

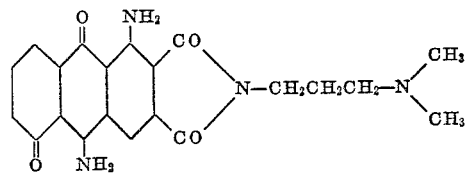

EXAMPLE 13

Example 12 was repeated except that the heat fixation step was carried out by contacting the dried padding on both sides with smooth metal plates at 230° C. for 2 seconds. Similar good results were obtained.

EXAMPLE 14

(a) Example 1, parts (a) and (b), was repeated except that an equal weight of trimethylamine hydrochloride was substituted for ammonium sulfate and the carbinol form of Victoria Green C.I. 42,000 was submitted for the violet dye base. Equally good results were obtained.

(b) Example 1, parts (a) and (b), was repeated except that an equal weight of triethylamine hydrobromide was substituted for ammonium sulface and the carbinol form of Victoria Green, C.I. 42,000 was substituted for the violet dye base. Equally good results were obtained.

(c) Soluble acid salts of other aliphatic amines operable in the present example include those of the following amines: methylamine, ethylamine, propylamine, dimethylamine, diethylamine, dipropylamine, and tripropylamine.

EXAMPLE 15

Example 1, parts (a) and (b), was repeated except that acid-modified polyester fiber ("Dacron" Type 62) was substituted for the polyacrylic fiber, and the temperature in part (a) was raised to 100° C. and the carbinol form of Victoria Green (C.I. 42,000) was substituted for the violet dye base. A clear, strong green dyeing having substantially improved fastness to sublimation was obtained as compared with a control dyeing made on untreated acid-modified polyester fiber.

Equally good results were obtained when the blue dye base 1-amino-2-bromo-4-(3-dimethylaminopropylamino)-anthraquinone was used.

EXAMPLE 16

Example 9 was repeated substituting acid-modified polyester fiber for the polyacrylic fiber, raising the fiber pretreating temperature to 100° C. and substituting the 1-amino - 2 - bromo-4-(3-dimethylaminopropylamino) anthraquinone as the dye. Similar good results were obtained.

Equally good results were obtained when the following dye base was used:

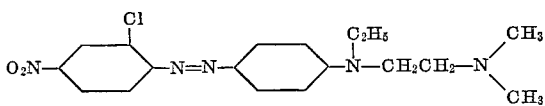

The preceding representative examples may be varied within the scope of the present total specification disclosure, as understood and practiced by one skilled in the art to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. In a process for the dyeing of anionic polymeric textile material substrates selected from the group consisting of polyacrylonitrile, polyethylene terephthalate and blends thereof with cellulose, said process being carried out at elevated temperatures, the improvement which comprises dyeing said substrates having attached thereto a cation selected from the group consisting of —H and —$NHR_1R_2R_3$, wherein said $R_1$, $R_2$, and $R_3$ are individually selected from the group consisting of hydrogen and $C_{1-3}$ alkyl, with nonionic thermally-stable basic dye bases at a temperature within the range of from about 100° to 230° C. and at a pH of 7 or higher, sufficiently basic to maintain said dye in essentially water insoluble form.

2. The process of claim 1 wherein said substrate is dyed employing dry heat at a temperature within the range of from about 182° to 230° C. for from about 2 seconds to 5 minutes.

3. The process of claim 1 wherein said substrate is dyed employing steam at a temperature within the range of from about 100° to 126° C. for from about 5 to 60 minutes.

4. The process of claim 1 wherein said substrate is essentially polyacrylonitrile containing ammonium sulfonate groups.

5. The process of claim 1 wherein said substrate is a blend of (1) polyacrylonitrile fibers containing ammonium sulfonate groups and of (2) cotton fibers.

6. The process of claim 1 wherein said substrate is a blend of (1) polyacrylonitrile fibers containing ammonium sulfonate groups and of (2) rayon fibers.

References Cited

UNITED STATES PATENTS

| 2,972,508 | 2/1961 | Kruckenberg et al. | 8—41 |
| 3,123,432 | 3/1964 | Webb | 8—21 |
| 3,173,747 | 3/1965 | Wyse. | |
| 3,300,272 | 1/1967 | Robinson | 8—100 |

GEORGE F. LESMES, Primary Examiner

T. J. HERBERT, JR., Assistant Examiner

U.S. Cl. X.R.

8—55; 260—80.73